Oct. 15, 1957
K. F. GALLIMORE ET AL
2,809,418
GUIDEWAY AND GIB CONSTRUCTIONS
Original Filed Nov. 17, 1948
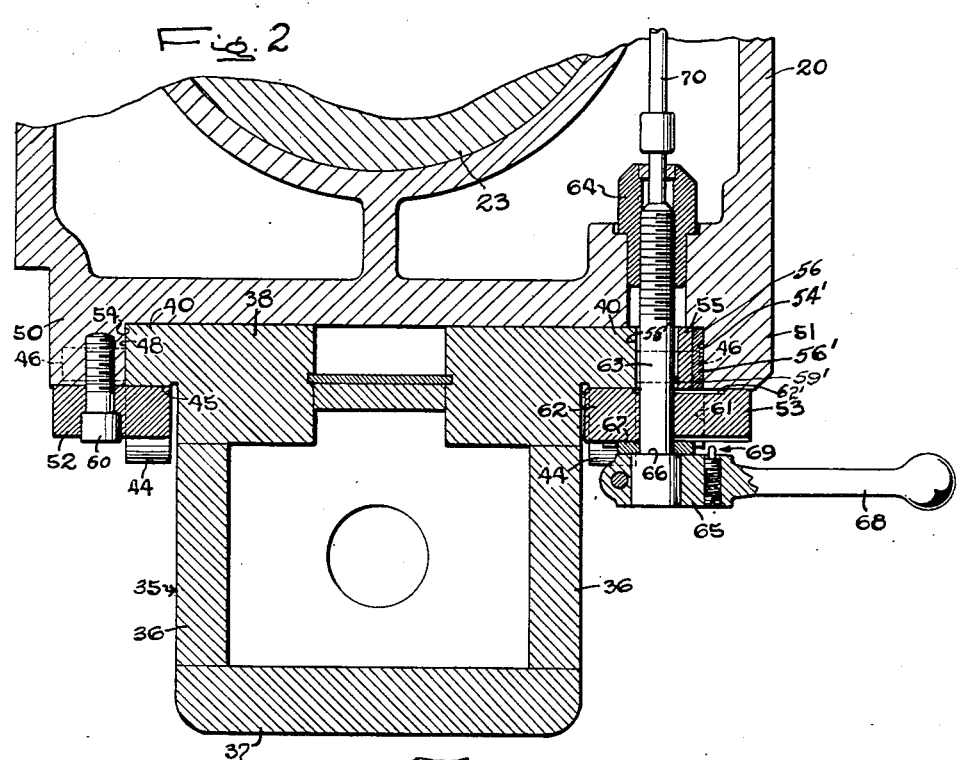
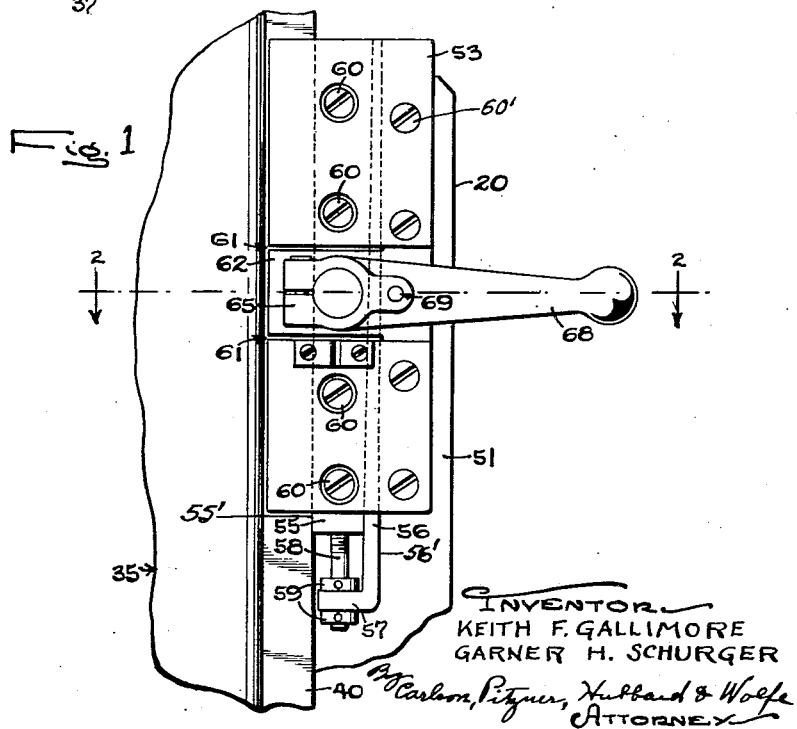
INVENTOR
KEITH F. GALLIMORE
GARNER H. SCHURGER
ATTORNEY

United States Patent Office 2,809,418
Patented Oct. 15, 1957

2,809,418

GUIDEWAY AND GIB CONSTRUCTIONS

Keith F. Gallimore and Garner H. Schurger, Fond du Lac, Wis., assignors to Giddings & Lewis Machine Tool Company, Fond du Lac, Wis., a corporation of Wisconsin Original application November 17, 1948, Serial No. 60,438, now Patent No. 2,730,021, dated January 10, 1956. Divided and this application February 2, 1954, Serial No. 407,778

6 Claims. (Cl. 29—1)

The invention relates to improvements in machine tools of the types having guideways for translatable elements and it is more particularly concerned with an improved guideway and gib construction for use with such machines.

One object of the invention is to provide a gib construction which insures a precisely accurate fit between a translatable element and its supporting and guiding structure and which is quickly and easily adjustable to maintain such fit as the coacting parts become worn through use.

Another object is to provide a gib construction which may be adjusted to take up wear without disturbing the assembled parts of the machine.

Still another object is to provide a gib construction which permits attachment of a guide plate in a novel manner which affords more rigid support for the translatable machine element with which it co-operates.

Other objects and advantages of the invention will become apparent from the following detailed description of the preferred embodiment illustrated in the accompanying drawings, in which:

Figure 1 is a fragmentary bottom view of a machine tool guideway equipped with a gib construction and clamping means embodying the features of the invention.

Fig. 2 is a sectional view of the machine taken in a plane substantially on the line 2—2 of Fig. 1.

The present application is a division of our co-pending application Serial No. 60,438, filed November 17, 1948 now Patent No. 2,730,021 issued January 10, 1956. For purposes of illustration, the invention has been shown and will be described herein as incorporated in the guideway provided on a headstock of the type disclosed in that application. It is to be understood, however, that this embodiment is merely exemplary and that the invention may be utilized in other machine structures employing translatable elements requiring rigid support and accurate guidance.

In a machine selected to illustrate the invention, a housing 20, which in this instance constitutes a part of a spindle headstock, is provided on its underside with guideways for supporting and guiding a translatable element 35 which, in the exemplary embodiment, constitutes a spindle supporting arm. The translatable element 35 as shown is rectangular in cross section and is made up of side members 36, a bottom member 37 and a top member 38 assembled and secured together in suitable manner to form a rigid box-type structure.

To provide support for the translatable element 35 on the housing 20, the top member 38 is extended at opposite sides to form longitudinal flange-like ways 40 adapted to co-operate with supporting and guiding means carried on the underside of the housing. As herein shown, the ways 40 are supported and guided by roller bearing units, including rollers 44 underlying and engaging the bottom surfaces 45 of the ways 40. Other rollers 46 provided on the units are positioned to engage vertical guiding surfaces 38 on the outer edges of the ways 40.

To insure a high degree of accuracy and to provide for taking up wear, the supporting and guiding action of the rollers 44 and 46 is supplemented by a guideway preferably located adjacent the forward end of the headstock. For this purpose the housing 20 is formed with depending ribs 50 and 51 located at opposite sides of the translatable element 35 as shown in Fig. 2. Bearing plates 52 and 53 of bronze or other suitable material are secured to the ribs so as to extend under the ways to engage the guide surfaces 45. It will be understood, of course, that the bearing plates are dimensioned to fit between the rollers 44 or alternatively the plates may be suitably recessed to afford clearance for the rollers. In the present instance, the rib 50 is formed with an inwardly facing vertical bearing or guide surface 54 adapted for slidable engagement with the vertical face 48 with the adjacent way 40. The rib 51 is likewise formed with a vertical guide surface 54' which, in this instance, is spaced from the opposed way surface 45. Thus the machine elements are formed with two sets of bearing surfaces disposed perpendicular to each other, in this instance one set being vertical and the other horizontal.

Disposed within the space between the bearing surfaces 45 and 54' is a gib assembly embodying novel features of construction which provide for convenient and accurate adjustment to establish and maintain a precise fit between the bearing surfaces. In its preferred form, the gib assembly comprises a pair of elongated gib members 55 and 56 of bronze or other suitable bearing material assembled in abutting side-by-side relation. The gib members are complementally shaped so that when assembled in the above manner, they present their outer forms 55' and 56' in parallel vertical planes at opposite sides of the assembly. As shown in Fig. 2, one vertically disposed face, in this instance the face 55' of the member 55, is in sliding contact with the adjacent vertical face of the way 40. The opposite face 56' of the gib member 56 is in contact with the bearing face 46 of the guideway.

To provide for adjustment of the effective width of the gib assembly, the abutting faces of the members 55 and 56 are complementally inclined with respect to the longitudinal axes of the member. In other words, the members 55 and 56 are constructed so as to effect a laterally directed wedging action upon endwise adjustment of one gib member relative to the other. In the exemplary embodiment, the inner member 55 may be thus shifted into bearing engagement with the way surface 40 by endwise shifting of the outer member 56 to establish an initial bearing fit and to take up wear.

The invention provides means of a simple yet effective character for relatively shifting the gib members 55 and 56 longitudinally to effect the above adjustment. To this end the member 56 is formed with a lateral extension 57 (Fig. 1) adapted to project over but spaced from the adjacent end of the member 55. An adjusting screw 58 threaded into the end of the member 55 projects longitudinally therefrom through a clearance hole in the extension 57 and is confined against endwise movement relative thereto by spaced abutment members, such as collars 59, rigidly attached to the screw on opposite sides of the extension. By rotating the screw 58 the members are relatively shifted longitudinally to move the member 55 toward the way bearing surface.

In accordance with another aspect of the invention, the improved gib assembly is constructed and arranged to provide for attachment of the bearing plate 53 to the housing 20 in a manner which affords more rigid support for the translatable element 35. To this end, the inner gib member 55 is formed with a series of apertures 59' for the accommodation of screws 60 passing through the plate 53 and threading into the housing. It will be observed that the screws 60, in this instance are as close to the inner bearing surface of the plate as the similar screws attaching the bearing plate 52 although the latter does not have to accommodate a gib assembly. An additional series of screws 60 may be provided adjacent the outer edge of the plate if desired to further strengthen the assembly.

It will be understood, of course, that the apertures 59' are elongated transversely of the gib member 55 to allow lateral shifting of the member in its adjustment. To effect such adjustment, the screws 60 are loosened to permit endwise movement of the companion gib member 56 by operation of the adjusting screw 58. After adjustment is effected, the screws 60 are tightened firmly anchoring the bearing plate 53 to the housing and additionally clamping the gib member 55 in adjusted position. This has the further advantage of relieving the adjusting screw of the strain of retaining the gib member in position.

The rib 51 is dimensioned so that the tightening of the screws 60 does not produce a clamping action on the translatable element 35. To provide for clamping that element in fixed position after adjustment, the guide plate 53 is slotted transversely as at 61 (Fig. 1) to define a resilient tongue portion 62 adapted to be forced into clamping engagement with the underside of the adjacent way 40. This tongue is recessed as at 62' on its inner face to clear the gib members 55 and 56 (Fig. 2). The clamping action is effected by means of a shaft 63 extending through an aperture in the tongue 62, and a clearance slot in the gib member 55, and having its upper end threaded into a nut 64 (Fig. 2) non-rotatably anchored in the housing 20. The lower end of the shaft 63 is arranged to project below the tongue 62 and is formed with an enlarged head 65 defining a shoulder 66 in opposed relation to the tongue. A washer 67 interposed between the shoulder 66 and the tongue 62 serves to transmit the thrust from the shaft to the tongue as the shaft is screwed into the nut 64.

To facilitate actuation of the clamping shaft, a handle 68 is non-rotatably fixed on its projecting end or head portion 65. In the assembly of the machine, the spacing of the nut 64 from the head 65 of the shaft is adjusted so that the clamping and releasing of the translatable element may be effected by rocking the handle 68 through a relatively small angle, as for example, an angle of approximately 90°. Preferably, the arrangement is such that the handle extends laterally from the headstock when the translatable element is clamped and lies parallel to the translatable element and in underlying relation to the headstock when the translatable element is freed for transversing movement. A spring-pressed detent 69 provided on the handle engages in suitable indentations in the guide plate 53 to releasably retain the clamping handle in either of the above positions.

The clamping mechanism may be advantageously interlocked with other controls of the machine in which it is installed as, for example, to prevent engagement of the feed for the translatable element when it is clamped in fixed position. Such interlocking is conveniently effected by forming the shaft 63 with an extension at its inner end to which a control shaft 70 may be suitably secured for rotation as a unit with the clamping shaft.

It will be apparent from the foregoing that the invention provides a guideway and gib construction of novel and advantageous character for use with the translatable elements of machine tools and comparable machines. An initial accurate fit between the relatively moving parts may be obtained very quickly and easily and quick and convenient adjustment may be effected to take up wear without requiring disassembly of the machine. The improved gib construction also permits the bearing plate of the guideway to be mounted in an advantageous manner which provides firmer and more rigid support for the translatable element of the machine. Further, the translatable element may be rigidly clamped in fixed position.

We claim as our invention:

1. In a spindle headstock, in combination, a housing, an elongated member having laterally projecting ways extending along each side, means supporting and guiding said member on said housing for linear translation including a pair of parallel elongated ribs depending from said housing on opposite sides of said ways, bearing plates secured to said ribs and extending under said ways to support said member, one of said ribs having a bearing surface adapted to coact with the side edge of the adjacent way to guide said member, and adjustable guide means interposed between the other of said ribs and the side edge of the other way, said guide means comprising a pair of elongated gib members assembled in side-by-side relation with their outer faces parallel and their abutting surfaces complementally inclined lengthwise thereof, an extension adjacent the end of one of said gib members projecting over and spaced from the corresponding end of the other gib member, and an adjusting screw rotatably anchored in said extension and threaded into said other gib member, said adjusting screw being operative to relatively shift said gib members to vary the effective width of the assembly.

2. In an adjustable gib construction for use between spaced parallel bearing surfaces of fixed and translatable machine elements, in combination, a pair of elongated wedge-shaped members assembled in abutting side-by-side relation so as to present their outside faces in parallel planes for engagement with the spaced bearing surfaces, said members being relatively movable axially and having their abutting surfaces inclined relative to their longitudinal axes so as to vary the lateral spacing of said planes in response to such relative movement, a bearing plate supporting said members, said plate being formed intermediate its ends with transverse slots defining a resilient tongue extending substantially beyond the assembled members so as to underlie a portion of the translatable element adjacent the innermost one of the members, and means for urging said tongue into clamping engagement with the translatable element, said tongue having its inner face recessed to afford clearance for said wedge-shaped members when urged to clamping position.

3. A gib construction as defined in claim 2 wherein the assembled members are adapted to be confined between a vertical bearing surface on a translatable element and a vertical surface on a stationary machine part and wherein the means for urging the resilient tongue to clamping position constitutes a rotatable member threaded into the stationary part and extending through a clearance opening in the wedge-shaped member adjacent the translatable element.

4. In a guideway and gib construction for machine tools having a pair of relatively translatable elements presenting a first pair of bearing surfaces disposed in one plane and a second pair of bearing surfaces disposed in a plane normal to said first plane and with the second bearing surface of one of said elements defined by a bearing plate removably secured to one of the elements by threaded fastening elements, the combination of a pair of elongated wedge-shaped gib members assembled in abutting side-by-side relation so as to present their outside faces in parallel planes engageable with the first pair of bearing surfaces, the innermost gib member being substantially wider than the companion gib member and having a series of apertures extending therethrough for the accommodation of the fastening elements securing the bearing plate in place.

5. A guideway and gib construction as defined in claim 4 in which the apertures in the inner gib member are dimensioned to permit transverse adjustment of the member and the gib member itself is dimensioned so that the tightening of the fastening elements to secure the bearing plate in place will effectively clamp the member in adjusted position.

6. A guideway and gib construction as defined in claim 5 in which the bearing plate is slotted transversely to define a resilient tongue portion which portion is recessed on its inner face to clear the gib members and thus permit it to be clamped against the bearing surface of the companion translatable element.

References Cited in the file of this patent

UNITED STATES PATENTS

| | | |
|---|---|---|
| 2,307,238 | Ross | Jan. 5, 1943 |
| 2,373,637 | Kylin | Apr. 10, 1945 |
| 2,435,849 | Schlitters | Feb. 10, 1948 |
| 2,593,230 | Walter | Apr. 15, 1952 |